United States Patent
Saito

Patent Number: 6,088,401
Date of Patent: Jul. 11, 2000

[54] QAM SIGNAL RECEIVER

[75] Inventor: Toshio Saito, Tokyo, Japan

[73] Assignee: NEC Corporation, Tokyo, Japan

[21] Appl. No.: 09/187,341

[22] Filed: Nov. 6, 1998

[30] Foreign Application Priority Data

Nov. 7, 1997 [JP] Japan ................................ 9-320560

[51] Int. Cl.[7] ................................................ H04L 27/14
[52] U.S. Cl. ........................... 375/324; 375/261; 329/304
[58] Field of Search .................................... 375/261, 298, 375/322, 324, 340, 316; 329/304

[56] References Cited

U.S. PATENT DOCUMENTS

| | | |
|---|---|---|
| 4,004,226 | 1/1977 | Qureshi et al. ........................... 333/18 |
| 4,028,626 | 6/1977 | Motley et al. ........................... 375/235 |
| 4,253,184 | 2/1981 | Gitlin et al. ........................... 375/229 |
| 5,113,142 | 5/1992 | Yoshikawa ........................... 329/306 |

*Primary Examiner*—Temesghen Ghebretinsae
*Attorney, Agent, or Firm*—Whitham, Curtis & Whitham

[57] ABSTRACT

To provide a QAM signal receiver wherein the phase distortion derived from frequency conversion into IF signal is corrected in accordance with selection of an RF channel to be received, the QAM signal receiver comprises a first and a second pre-equalizer (9 and 10) made of transversal filters for processing an in-phase and a quadrature-phase digital signal obtained from the QAM signal; a first and a second equalizer controller (12 and 13) for selecting tap gains to be applied to the first and the second pre-equalizer (9 and 10) in synchronization with selection of the RF channel according to a channel-selection signal for controlling a freqency converter (2).

4 Claims, 1 Drawing Sheet

QAM SIGNAL RECEIVER

BACKGROUND OF THE INVENTION

The present invention relates to a multi-valued quadrature-amplitude-modulation (hereinafter abbreviated as QAM) signal receiver, and particularly to a receiver unit of the QAM signal which can correct demodulation distortion accompanying carrier frequency conversion of the QAM signal.

Generally, an RF (Radio-Frequency) QAM signal, which is transmitted including phase-shift modulation components, is received by a receiver unit and frequency-converted into an IF (Intermediate-Frequency) signal to be demodulated. However, it is difficult to reflect the phase-shift modulation components of the RF QAM signal exactly onto the IF signal, and the phase distortion of the IF signal derived from frequency conversion causes distortion of an I (In-phase) signal and a Q (Quadrature-phase) signal which are obtained by demodulating the IF signal, resulting in code errors.

This phase distortion depends on carrier-frequency difference between the IF signal and the RF QAM signal to be converted, and therefore, differs according to an RF channel of the QAM signal to be received.

Two types of countermeasures have been considered conventionally for preventing this phase distortion.

Countermeasures of the first type are to improve phase characteristic of the frequency converter. In an example of this type, RF QAM signals of channels having different RF carrier frequencies are once up-converted into a high-frequency signal having certain frequency higher than the RF carrier frequencies. The IF signal is obtained by down-converting the high-frequency signal. By thus processing, for example, frequency conversion into the IF signal can be performed with comparatively high fidelity in the phase characteristic. However, countermeasures of this type need large circuit sizes and high costs.

Countermeasures of the second type are to correct the phase distortion making use of an equalizer, whereof an example is disclosed in a U.S. Pat. No. 5,113,142. In this prior art, an automatic adaptive equalizer is used for correcting the phase distortion which differs depending on an RF channel to be received. However, the automatic adaptive equalizer also makes high the cost of the QAM receiver unit.

SUMMARY OF THE INVENTION

Therefore, a primary object of the present invention is to provide a QAM signal receiver wherein the phase distortion derived from frequency conversion is corrected in accordance with selection of an RF channel to be received, with simple circuit configuration.

In order to achieve the object, a QAM signal receiver according to the invention comprises:

a frequency converter for converting a QAM signal of one of a plurality of RF channels to be received into an IF signal making use of an LF (Local Frequency) signal;

an LF controller for selecting a frequency of the LF signal used by the frequency converter among local frequencies according to a channel-selection signal, each of the local frequencies being determined corresponding to one of the RF channels to be received;

a VCO (Voltage-Controlled Oscillator) for reproducing a first reference carrier signal according to the IF signal;

a first synchronous detector for extracting an in-phase signal component from the IF signal making use of the first reference carrier signal;

a first A/D (Analog-to-Digital) converter for converting the in-phase signal component into an in-phase digital signal;

a first pre-equalizer made of a transversal filter for processing the in-phase digital signal with a set of tap gains;

a first equalizer controller for selecting the set of tap gains to be applied to the first pre-equalizer among sets of tap gains prepared for the first pre-equalizer according to the channel-selection signal;

a phase shifter for generating a second reference carrier signal by shifting a phase of the first reference carrier signal by $\pi/2$;

a second synchronous detector for extracting a quadrature-phase signal component from the IF signal making use of the second reference carrier signal;

a second A/D converter for converting the quadrature-phase signal component into an quadrature-phase digital signal;

a second pre-equalizer made of a transversal filter for processing the quadrature-phase digital signal with a set of tap gains; and a second equalizer controller for selecting the set of tap gains to be applied to the second pre-equalizer among sets of tap gains prepared for the second pre-equalizer according to the channel-selection signal.

Each of the sets of tap gains prepared for the first pre-equalizer is predetermined according to a measurement result of signal distortion of the in-phase digital signal derived from frequency conversion of corresponding one of the RF channels performed in the frequency converter; and each of the sets of tap gains prepared for the second pre-equalizer is predetermined according to a measurement result of signal distortion of the quadrature-phase digital signal derived from frequency conversion of corresponding one of the RF channels performed in the frequency converter.

Therefore, a high-quality and low-cost QAM signal receiver can be realized, with a low-cost frequency converter, such as a single-conversion type frequency converter, and pre-equalizers of small and simple configuration, by specializing the pre-equalizers to correct only the amplitude distortion corresponding to RF channels to be received,

BRIEF DESCRIPTION OF THE DRAWINGS

The foregoing, further objects, features, and advantages of this invention will become apparent from a consideration of the following description, the appended claims, and the accompanying drawing, wherein;

DETAILED DESCRIPTION OF THE PREFERRED EMBODIMENTS

Figure 1:
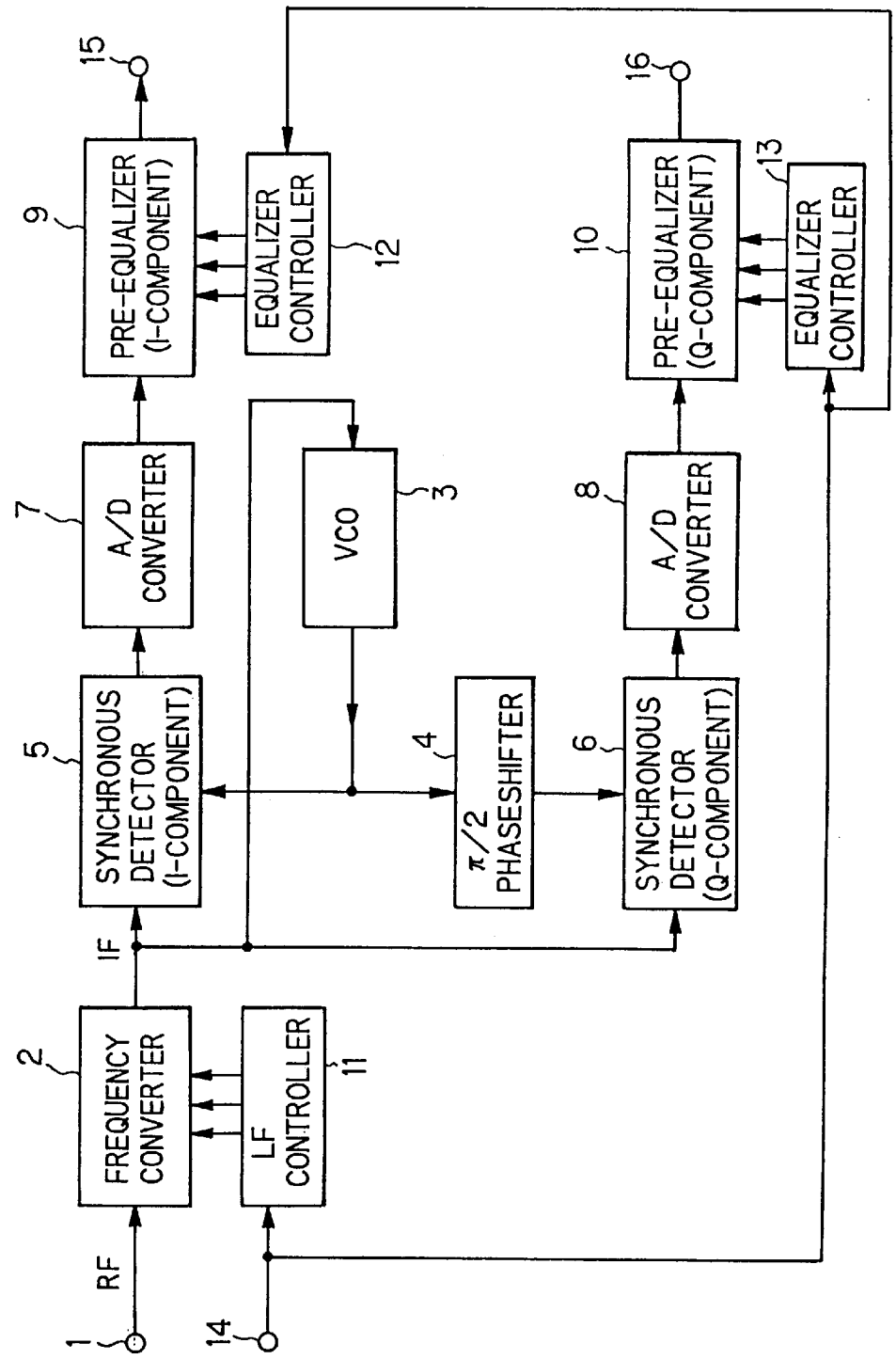
FIG. 1 is a block diagram illustrating a QAM signal receiver according to an embodiment of the invention.

Now, embodiments of the present invention will be described in connection with a block diagram of FIG. 1.

Referring to FIG. 1, a QAM signal receiver according to an embodiment comprises a frequency converter 2, a VCO (Voltage Controlled Oscillator) 3, a $\pi/2$ phase shifter 4, an in-phase demodulator circuit including a first synchronous detector 5, a first A/D (Analog-to-Digital) converter 7, a first pre-equalizer 9 and a first equalizer controller 12, a quadrature-phase demodulator circuit including a second synchronous detector 6, a second A/D converter 8, a second pre-equalizer 10 and a second equalizer controller 13, and an LF (Local Frequency) controller 11.

The other components than the first and the second pre-equalizer 9 and 10 and the first and the second equalizer controller 12 and 13 operate in the same way with ordinary QAM signal receiver.

The frequency converter 2 performs frequency conversion of a QAM signal of an RF channel inputted from an RF input terminal 1 into an IF signal by multiplying an LF signal. The VCO 3 generates a first reference carrier signal referring to the IF signal. The $\pi/2$ phase shifter 4 generates a second reference carrier signal by phase-shifting the first reference carrier signal by $\pi/2$. The first and the second synchronous detector 5 and 6 extract an in-phase and a quadrature-phase signal component of the QAM signal by multiplying the first and the second reference signal to the IF signal, respectively. The first and the second A/D converter 7 and 8 convert the in-phase and the quadrature-phase signal component into digital signals, that is, into an in-phase and an quadrature-phase digital signal, respectively.

In ordinary QAM signal receivers, the in-phase and the quadrature-phase digital signal are processed in digital with Nyquist wave-form-shaping, for example, and decoded into a data sequence. In the embodiment, the first and the second pre-equalizer 9 and 10 are provided between the first and the second A/D converter 7 and 8 and an in-phase and a quadrature-phase output terminal 15 and 16, respectively.

In general, RF channels to be received by a QAM signal receiver are predetermined, and the LF controller 11 selects a frequency of the LF signal to be multiplied to the QAM signal for the frequency conversion in the frequency converter 2, according to a channel-selection signal designated by a user through a selection-signal input terminal 14.

As previously described, the phase distortion derived from the frequency conversion depends on carrier-frequency difference between the IF signal and the RF QAM signal to be converted, and certain phase distortion gives certain amplitude distortion of the in-phase and the quadrature-phase signal component. In other words, the amplitude distortions of the in-phase and the quadrature-phase signal component are determined peculiarly according to the RF channel to be received. Therefore, by previously measuring the amplitude distortions of the in-phase and the quadrature-phase signal component for every of the RF channels to be received, they can be corrected making use of equalizers.

In the embodiment, transversal filters are used for the first and the second pre-equalizer 9 and 10, whereof tap gains are controlled by the first and the second equalizer controller 12 and 13.

When an RF channel is designated by way of the channel-selection signal inputted through the selection-signal input terminal 14, the LF controller 11 selects a frequency of the LF signal corresponding to the designated RF channel. At the same time, the first equalizer controller 12 selects a set of tap gains, which is corresponding to the designated RF channel, to be applied to the first pre-equalizer 9, among sets of tap gains each predetermined so as to correct the amplitude distortion of the in-phase digital signal outputted from the first A/D converter 7 derived from the frequency conversion of each of the RF channels to be received, according to the channel-selection signal. In the same way, the second equalizer controller 13 selects a set of tap gains, which is corresponding to the designated RF channel, to be applied to the second pre-equalizer 10 among sets of tap gains predetermined for the second pre-equalizer 10, in synchronization with the LF controller 11 and the first equalizer controller 12, according to the channel-selection signal.

Thus, the in-phase and the quadrature-phase digital signal, whereof the amplitude distortion derived from the frequency conversion is corrected, are outputted from the in-phase and the quadrature-phase output terminal 15 and 16, respectively, to be processed for reproducing the data sequence of few errors, with Nyquist wave-form-shaping, for example.

As heretofore described, by providing pre-equalizers specially prepared for correcting the amplitude distortion corresponding to RF channels to be received, a high-quality and low-cost QAM signal receiver can be realized, with a low-cost frequency converter, such as a single-conversion type frequency converter, and pre-equalizers of small and simple configuration, enabling small-sizing and low power-consumption of the QAM signal receiver.

What is claimed is:

1. A QAM (Quadrature-Amplitude-Modulation) signal receiver; comprising:

a frequency converter for converting a QAM signal of one of a plurality of RF (Radio-Frequency) channels to be received into an IF (Intermediate-Frequency) signal making use of an LF (Local Frequency) signal;

a VCO (Voltage-Controlled Oscillator) for reproducing a first reference carrier signal according to the IF signal;

a first synchronous detector for extracting an in-phase signal component from the IF signal making use of the first reference carrier signal;

a first A/D (Analog-to-Digital) converter for converting the in-phase signal component into an in-phase digital signal;

a first pre-equalizer for processing the in-phase digital signal according to a first equalizing characteristic;

a phase shifter for generating a second reference carrier signal by shifting a phase of the first reference carrier signal by $\pi/2$;

a second synchronous detector for extracting a quadrature-phase signal component from the IF signal making use of the second reference carrier signal;

a second A/D converter for converting the quadrature-phase signal component into an quadrature-phase digital signal;

a second pre-equalizer for processing the quadrature-phase digital signal according to a second equalizing characteristic;

an LF controller for selecting a frequency of the LF signal used by the frequency converter among local frequencies, each of the local frequencies being determined corresponding to one of the RF channels to be received;

a first equalizer controller for selecting the first equalizing characteristic among equalizing characteristics prepared for the first pre-equalizer in synchronization with the LF controller, each of the equalizing characteristics prepared for the first pre-equalizer being determined corresponding to one the RF channels to be received; and a second equalizer controller for selecting the second equalizing characteristic among equalizing characteristics prepared for the second pre-equalizer in synchronization with the LF controller, each of the equalizing characteristics prepared for the second pre-equalizer being determined corresponding to one the RF channels to be received.

2. A QAM signal receiver as recited in claim 1; wherein:
the LF controller selects the frequency of the LF signal according to a channel-selection signal;

the first and the second pre-equalizer are made of transversal filters;

the first equalizer controller selects the first equalizing characteristic by selecting a first set of tap gains to be applied to the first pre-equalizer among sets of tap gains prepared for the first pre-equalizer, according to the channel-selection signal; and the second equalizer controller selects the second equalizing characteristic by selecting a second set of tap gains to be applied to the second pre-equalizer among sets of tap gains prepared for the second pre-equalizer, according to the channel-selection signal.

3. A QAM signal receiver as recited in claim 2; wherein:

each of the sets of tap gains prepared for the first pre-equalizer is predetermined according to a measurement result of signal distortion of the in-phase digital signal derived from frequency conversion of corresponding one of the RF channels performed in the frequency converter; and each of the sets of tap gains prepared for the second pre-equalizer is predetermined according to a measurement result of signal distortion of the quadrature-phase digital signal derived from frequency conversion of corresponding one of the RF channels performed in the frequency converter.

4. A QAM signal receiver as recited in claim 1; wherein a single-conversion type frequency converter is employed as the frequency converter.

* * * * *